US008573181B2

(12) United States Patent
Arnett et al.

(10) Patent No.: US 8,573,181 B2
(45) Date of Patent: Nov. 5, 2013

(54) THROTTLE CONTROL SYSTEMS AND METHODS FOR INTERNAL COMBUSTION ENGINES TO REDUCE THROTTLE OSCILLATIONS

(75) Inventors: Michael Arnett, Wixom, MI (US); Christopher E. Whitney, Highland, MI (US); Per Andersson, Linkoping (SE); Justin A. Zaydel, Ludington, MI (US)

(73) Assignee: GM Global Technology Operations LLC

( * ) Notice: Subject to any disclaimer, the term of this patent is extended or adjusted under 35 U.S.C. 154(b) by 1078 days.

(21) Appl. No.: 12/565,297

(22) Filed: Sep. 23, 2009

(65) Prior Publication Data
US 2010/0154741 A1 Jun. 24, 2010

Related U.S. Application Data

(60) Provisional application No. 61/139,690, filed on Dec. 22, 2008.

(51) Int. Cl.
*F02D 41/00* (2006.01)

(52) U.S. Cl.
USPC ........................................... 123/361

(58) Field of Classification Search
USPC ......... 123/319, 349, 376, 361, 399, 403, 684, 123/690; 73/114.21–114.33
See application file for complete search history.

(56) References Cited

U.S. PATENT DOCUMENTS

| | | | | |
|---|---|---|---|---|
| 4,549,517 A | * | 10/1985 | Kamiyama | ................... 123/478 |
| 2008/0148827 A1 | * | 6/2008 | Keski-Hynnila et al. | .. 73/114.31 |

FOREIGN PATENT DOCUMENTS

| | | | |
|---|---|---|---|
| WO | WO2007/110774 A2 | 10/2007 | |
| WO | WO 2007110774 A2 | * | 10/2007 |

* cited by examiner

*Primary Examiner* — Stephen K Cronin
*Assistant Examiner* — Sizo Vilakazi

(57) ABSTRACT

A throttle control system includes a pressure comparison module and a throttle plate control module. The pressure comparison module determines an inlet pressure upstream from a throttle body and an outlet pressure downstream from the throttle body. The throttle plate control module controls a position of a throttle plate based on the inlet pressure and the outlet pressure.

19 Claims, 3 Drawing Sheets

THROTTLE CONTROL SYSTEMS AND METHODS FOR INTERNAL COMBUSTION ENGINES TO REDUCE THROTTLE OSCILLATIONS

CROSS-REFERENCE TO RELATED APPLICATIONS

This application claims the benefit of U.S. Provisional Application No. 61/139,690, filed on Dec. 22, 2008. The disclosure of the above application is incorporated herein by reference in its entirety.

FIELD

The present disclosure relates to throttle control systems and methods for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons. The reciprocating movement of the pistons produces drive torque. Air is drawn into an intake manifold through a throttle body and is regulated by a throttle plate in the throttle body. To provide a desired engine torque, a powertrain control module determines a desired throttle plate position based on a desired engine torque to provide a desired mass air flow.

SUMMARY

A throttle control system according to the present disclosure includes a pressure comparison module and a throttle plate control module. The pressure comparison module determines an inlet pressure upstream from a throttle body and an outlet pressure downstream from the throttle body. The throttle plate control module controls a position of a throttle plate based on the inlet pressure and the outlet pressure.

In other features, the throttle plate control module moves the throttle plate from a first throttle position to a second throttle position when a pressure difference between the inlet pressure and the outlet pressure is greater than or equal to a first threshold. The first and second throttle positions are determined based on desired engine torque. The throttle plate control module moves the throttle plate to a wide-open position when the pressure difference is below the first threshold.

A method of controlling a throttle plate includes: determining an inlet pressure upstream from a throttle body and an outlet pressure downstream from the throttle body; and controlling a throttle plate based on the inlet pressure and the outlet pressure.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
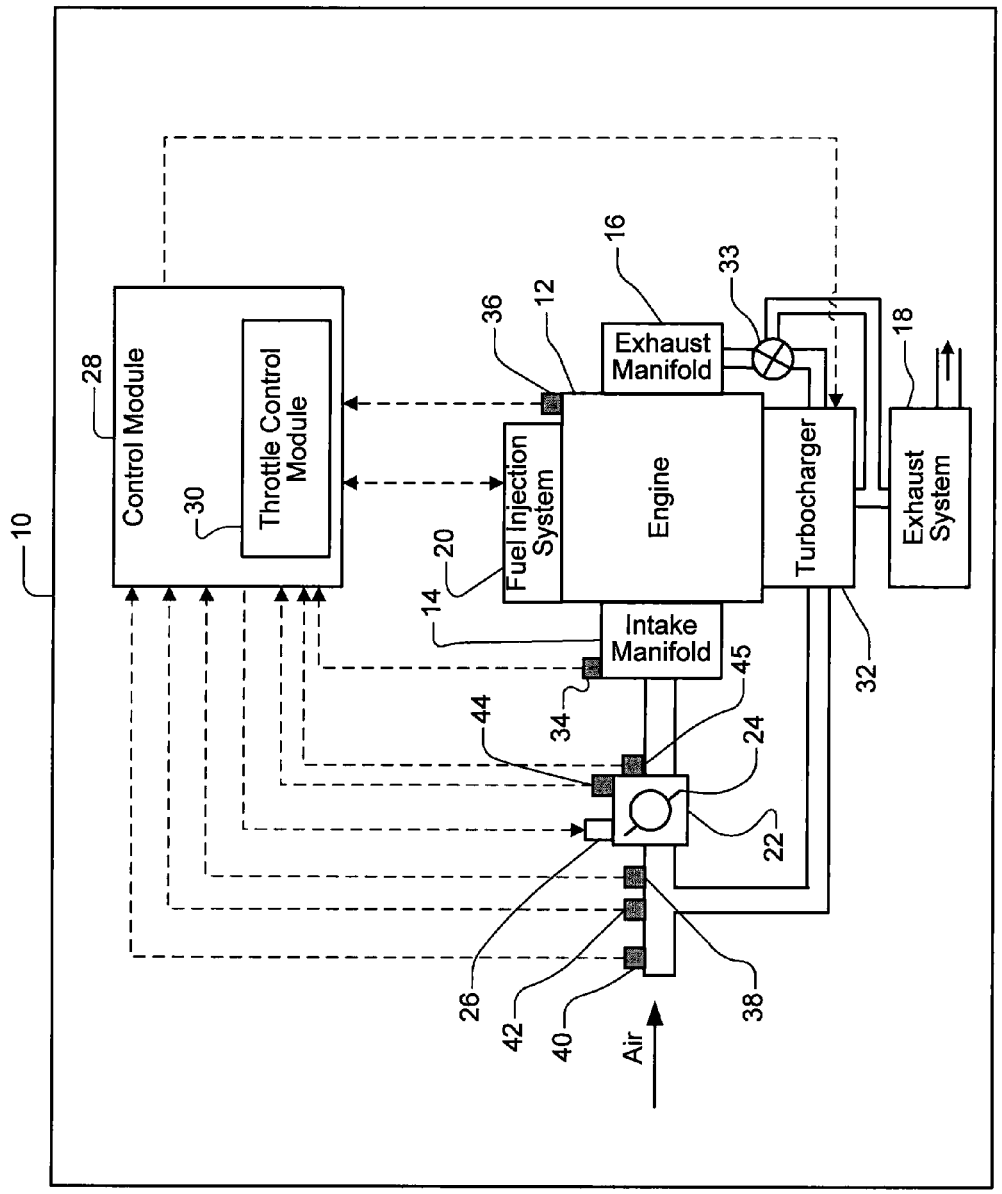
FIG. 1 is a functional block diagram of an exemplary engine system that includes a throttle control module according to the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To increase the mass air flow through the throttle body, the engine may be operated in a boost mode. In the boost mode, a supercharger or a turbocharger is activated to increase (or "boost") air pressure adjacent to an inlet of the throttle body. Due to the higher air pressure in the intake manifold, more air can be drawn into the cylinders and more fuel can be injected to increase engine torque. In the boost mode, a pressure difference across the throttle body is relatively small and the throttle plate tends to oscillate. As a result, the mass air flow through the throttle body and the resulting air/fuel ratio become unstable. The throttle plate may be damaged when oscillation continues for an extended period of time.

The throttle control module according to the present disclosure monitors air pressure adjacent to an inlet and an outlet of a throttle body and controls a throttle plate based on a pressure difference across the throttle body. When the pressure difference is below a threshold, the throttle plate is moved to a wide-open position to allow for maximum air flow and intake air is unthrottled. When the pressure difference is greater than or equal to the threshold, the throttle plate is controlled according to a desired throttle position that is determined based on a desired engine torque.

Referring to FIG. 1, the engine system 10 includes an engine 12, an intake manifold 14, an exhaust manifold 16, an exhaust system 18, and a fuel injection system 20. Air is drawn into the intake manifold 14 through a throttle body 22 and distributed into cylinders (not shown) through the intake manifold 14. Fuel is injected into the cylinders by the fuel injection system 20. The injected fuel mixes with the air and an air/fuel mixture is created in the cylinders. Pistons within the cylinders compress the air/fuel mixture. A spark plug (not shown) ignites the air/fuel mixture. Combustion of the air/fuel mixture generates a combustion force to drive the pistons that rotatably drive a crankshaft (not shown). The exhaust gas exits from the cylinders and flows through the exhaust manifold 16 and into the exhaust system 18. After the exhaust gas is treated in the exhaust system 18, the exhaust gas is released to atmosphere.

The throttle body 22 controls the amount of air flow into the engine 12. The throttle body 22 includes a throttle plate 24 and a throttle actuator 26. The throttle plate 24 is located inside the throttle body 22 and regulates the air flow. The throttle actuator 26 moves the throttle plate 24 to different throttle positions to generate a desired throttle area based on a desired engine torque. A control module 28 that communicates with the throttle actuator 26 determines the desired amount of air to be drawn into the engine 12 and controls the throttle actuator 26 accordingly.

The engine system 10 includes a turbocharger 32 that may be activated when the engine 12 is commanded to increase engine torque output. When the turbocharger 32 is not activated, the engine 12 uses the downward stroke of a piston to create the vacuum in the intake manifold 14. The ambient air is drawn into the intake manifold 14 and the cylinders due to the presence of a vacuum.

In the boost applications where the turbocharger 32 is activated, the exhaust gas drives the turbocharger 32 to increase air pressure at an outlet of the turbocharger 32. The outlet of the turbocharger 32 communicates with the inlet of the throttle body 22. Therefore, the intake air at the inlet of the throttle body 22 is compressed. The compressed intake air can be more quickly drawn into the cylinders. With the increased air flow, more fuel can be injected into the cylinders to increase the engine torque output. The control module 28 includes a throttle control module 30 that regulates the intake air flow through the throttle body 22 under the boost mode.

A wastegate 33 is provided adjacent to the inlet of the turbocharger 32 to divert exhaust gases away from the turbine wheel of the turbocharger 32. Diversion of exhaust gases regulates the turbine speed, which in turn regulates the rotating speed of the compressor of the turbocharger 32 and consequently the maximum boost pressure in the turbocharged system. Wastegate duty cycle refers to the percentage of time when the wastegate solenoid is activated to keep the wastegate 33 closed. A higher wastegate duty cycle keeps the wastegate 33 further closed, thereby creating more exhaust pressure across the turbine and improving the target boost pressure more quickly.

The engine system 10 further includes a plurality of sensors for monitoring engine operation. The plurality of sensors include, but are not limited to, an intake manifold air pressure (MAP) sensor 34, an engine speed sensor 36, a mass air flow (MAF) sensor 38, an intake air temperature (IAT) sensor 40, a barometric pressure (BP) sensor 42, and a throttle position sensor 44. The MAP sensor 34 is provided at the intake manifold 14 and measures an intake manifold absolute pressure. The engine speed sensor 36 measures the rotational speed (RPM) of the engine 12. The MAF sensor 38 measures the mass of air flowing into the intake manifold 14. The IAT sensor 40 measures an intake air temperature. The BP sensor 42 measures the barometric pressure of air upstream from the throttle body 22. The throttle position sensor 44 measures the position of the throttle plate 22. Optionally, a pressure sensor 45 may be provided immediately downstream from the throttle body 22 to measure an air pressure immediately after the air leaves the throttle body 22.

Figure 2:
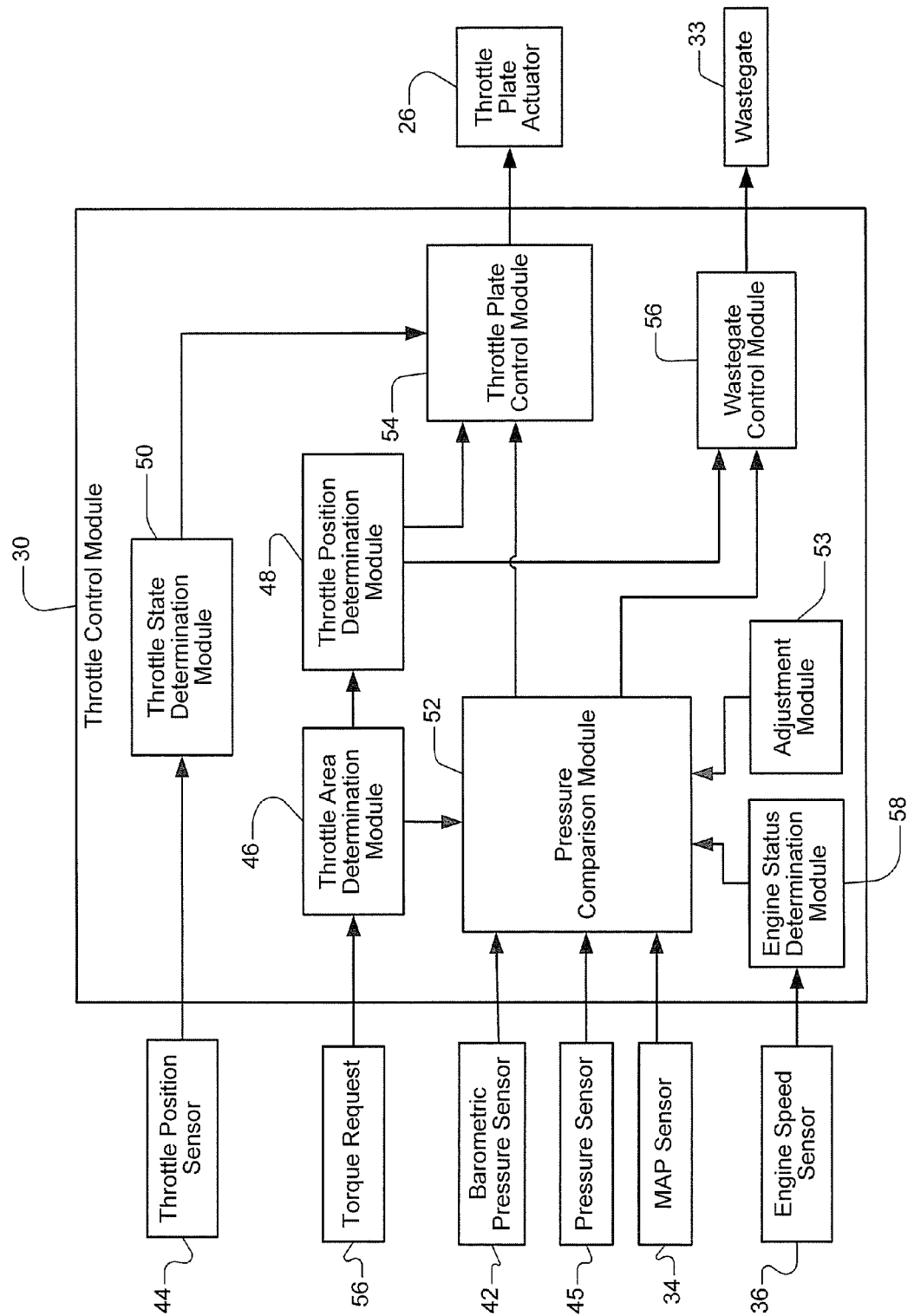
FIG. 2 is a functional block diagram of a throttle control module according to the present disclosure.

Referring to FIG. 2, the throttle control module 30 includes a throttle area determination module 46, a throttle position determination module 48, a throttle state determination module 50, a pressure comparison module 52, an adjustment module 53, a throttle plate control module 54, a wastegate control module 56, and an engine status determination module 58. The throttle area determination module 46 determines a desired throttle area based on a desired engine torque from a torque request 56. The throttle position determination module 48 determines a desired throttle position based on the desired throttle area. The throttle position determination module 48 may include a look-up table that includes correlations between the throttle area and the throttle position.

The throttle state determination module 50 determines whether the throttle body 22 is in a throttled state or in an unthrottled state based on signals from the throttle position sensor 44. In the throttled state, intake air is regulated according to a desired throttle position. In the unthrottled state, air is not regulated and the throttle plate 24 is in a position (for example, a wide-open position) to allow for maximum air flow. The maximum amount of air that is allowed to flow through the throttle body 22 varies with engine speed. Therefore, the wide-open position of the throttle plate 24 varies with engine speed.

The pressure comparison module 52 receives pressure readings from the MAP sensor 34 and the BP sensor 42 and optionally from the pressure sensor 45. The pressure comparison module 52 determines an inlet pressure adjacent to an inlet of the throttle body 22, an outlet pressure adjacent to an outlet of the throttle body 22, and a pressure difference between the inlet pressure and the outlet pressure.

The adjustment module 53 is provided to adjust or modify the throttle control for boost applications to make it suitable for a situation when the engine 12 is just started. The adjustment module 53 compares a desired air pressure (MAP) and a turbo basic pressure. The pressure comparison module 52 adjusts or modifies the throttle control based on the comparison between the desired MAP and the turbo basic pressure.

When the engine 12 is running, the pressure comparison module 52 compares the inlet pressure and the outlet pressure and determines how the throttle plate should be moved based on the inlet pressure and the outlet pressure during boost applications. When the engine 12 is just started, the pressure comparison module 52 determines how the throttle plate should be moved based on the desired MAP and the turbo basic pressure, as well as the inlet pressure and the outlet pressure. The pressure comparison module 52 commands to move the throttle plate through the throttle plate actuator 26 or through the wastegate 33 depending on engine running status and the desired MAP and the turbo basic pressure.

The engine status determination module 58 receives signals from the engine speed sensor 36 indicating whether the engine 12 is running or just started. For example only, when the engine speed is equal to or above a threshold speed, the engine status determination module 58 may determine that the engine 12 is running. When the engine speed is below a threshold speed, the engine status determination module 58 may determine that the engine 12 is just started.

More specifically, the pressure comparison module 52 determines a pressure difference between the inlet pressure and the outlet pressure and compares the pressure difference with a first threshold and a second threshold. In normal conditions (i.e., when the engine 12 is running and in boost applications), when the pressure difference is below a first threshold, the throttle plate control module 54 controls the throttle plate actuator 26 to move the throttle plate from a first throttle position to a wide-open position. When the pressure difference is equal to or above the first threshold, the throttle plate control module 54 moves the throttle plate from the first throttle position to a second throttle position. When the throttle plate is in a wide-open position and when the pressure difference exceeds a second threshold that is greater than the first threshold, the throttle plate control module 54 moves the throttle plate from the wide-open position to a third throttle position. When the throttle plate is in a wide-open position and the pressure difference is below the second threshold, the throttle plate remains in the wide-open position.

The ambient air pressure measured by the BP sensor 42 may be used as the inlet pressure. The MAP measured by the MAP sensor 34 may be used as the outlet pressure. When the pressure sensor 45 is provided, the pressure readings from either the MAP sensor 34 or the pressure sensor 45 may be used. Alternatively, the minimum of the MAP and the pressure reading from the pressure sensor 45 may be used as the outlet pressure to ensure that the pressure difference tends more toward being greater than the threshold.

Generally, the outlet pressure is lower than the inlet pressure. When the engine 12 is operated in a non-boost mode, the inlet pressure is approximately 1 bar (approximately 14.7 psi) and the outlet pressure is a vacuum pressure. In the boost mode, the inlet and outlet pressures are increased and the outlet pressure is generally close to the inlet pressure. When the outlet pressure is close to the inlet pressure, oscillation of the throttle plate 24 is likely.

In the following, "first throttle position", "second throttle position" or "third throttle position" refer to a desired throttle position that is determined by the throttle position determination module 48 based on a desired engine torque. The wide-open position refers to a position where the throttle plate 24 is open to an extent to allow for a maximum air flow at a particular engine speed. The first, second, and third throttle positions do not include the wide-open position.

When the throttle plate 24 is in a throttled state (for example, in a first throttle position) and the pressure difference across the throttle body 22 is greater than or equal to a first threshold, the throttle plate control module 54 controls the throttle plate 24 according to a desired throttle position (for example, the second throttle position). When the pressure difference is greater than or equal to the first threshold, the outlet pressure is sufficiently lower than the inlet pressure. For example only, the pressure ratio of the outlet pressure to the inlet pressure may be below 0.95. In this situation, oscillation of the throttle plate 24 is less likely. Therefore, the throttle plate control module 54 controls the throttle plate 24 according to the desired throttle position.

When the pressure difference across the throttle body 22 is below the first threshold, the throttle plate control module 54 moves the throttle plate 24 to a wide-open position to allow for a maximum air flow. In the wide-open position, the intake air is unthrottled and not regulated.

When the pressure difference is below the first threshold, the outlet pressure is close to the inlet pressure. For example only, when the pressure ratio of the outlet pressure to the inlet pressure is increased to approximately 0.95 or above, a small change in the inlet pressure and the outlet pressure results in a significant change in flow density of the intake air. The desired throttle area and the desired throttle position are function of the flow density. Therefore, the desired throttle position is constantly changed when a slight fluctuation occurs in the inlet and outlet pressures.

In this instance, if the throttle plate 24 is controlled according to the desired throttle position, the throttle plate 24 will be moved back and forth to adjust the throttle plate 24 to the constantly-changing, desired throttle position. As a result, the throttle plate 24 oscillates.

With the throttle control strategy of the present disclosure, the throttle plate 24 is moved to the wide-open position when the pressure difference between the inlet pressure and the outlet pressure is below the first threshold. The throttle plate 24 is controlled to remain in the wide-open position. Therefore, oscillation of the throttle plate 24 can be avoided.

The throttle plate 24 is moved from the wide-open position to a desired throttle position (for example, a third throttle position) when the pressure difference across the throttle body 22 becomes greater than or equal to a second threshold. The throttle plate 24 can be moved to the wide-open position again from the third throttle position when the pressure difference falls below the first threshold as previously described. The second threshold is set to be higher than the first threshold. In other words, the throttle control module 30 includes hysteresis, which is a path-dependent parameter. The required pressure difference between the inlet pressure and the outlet pressure for moving the throttle plate from a throttle position to a wide-open position is greater than that for moving the throttle plate from a wide-open position to a throttle position.

The second threshold is set higher than the first threshold to avoid oscillations that may occur when the pressure difference is slightly below or above the first threshold. More specifically, when the throttle plate 24 is in the wide-open position and the pressure difference is slightly below the first threshold, a slight change in the inlet pressure and the outlet pressure may cause the pressure difference to exceed the first threshold. If the same threshold is used, the throttle plate 24 will be moved to the third throttle position. The throttle plate 24 will be moved back to the wide-open position when the pressure difference becomes slightly below the first threshold again. As a result, the throttle plate 24 oscillates between a wide-open position and a desired throttle position. By setting a higher second threshold, oscillation of the throttle plate 24 can be avoided.

Alternatively, the pressure comparison module 52 may determine a pressure ratio of the outlet pressure to the inlet pressure. The throttle plate control module 54 may control the throttle plate 24 based on a comparison between the pressure ratio and a threshold.

When the engine is just started, the adjustment module 53 modifies the throttle control strategy based on a comparison between the desired MAP and the turbo basic pressure. The turbo basic pressure refers to the maximum achievable boost pressure with 0% wastegate duty cycle. Therefore, the turbo basic pressure is the maximum achievable boost pressure when the wastegate 33 is fully open to divert exhaust gas away from the turbocharger 32. The turbo basic pressure is determined based on design specifications of the turbocharger 32.

When the engine 12 is just started, the throttle area determination module 46 does not calculate a desired throttle area according to the torque request 56. Instead, the throttle area determination module 46 determines a throttle area that is larger than that corresponding to the torque request 56. For example only, the throttle area determination module 46 may determine a larger throttle area than necessary and the throttle plate control module 54 may move the throttle plate to a wide open position during engine start. The throttle area determination module 46 starts to determine a desired throttle area that corresponds to the torque request 56 when the manifold pressure (i.e., outlet pressure) and the pre-throttle pressure (i.e., inlet pressure) begin to increase. If the adjustment module 53 is not provided, the throttle plate control module 54 would transition the throttle plate from the wide open position to a throttle position when a difference between the inlet pressure and the outlet pressure is greater than a second threshold (with hysteresis), as previously described. This would cause a delay in moving the throttle plate from the wide-open position to a throttle position during engine start and result in an overshoot in MAP (for example only, 15 kPa). An overshoot in MAP causes oscillation of the throttle plate.

When the engine 12 is just started, to move the throttle plate from an un-throttled state (i.e., from a wide open position) to a throttled state (for example, to a desired throttle position), the desired MAP should be equal to or less than the turbo basic pressure or when the pressure difference between the inlet pressure and the outlet pressure is equal to or greater than a second threshold. Hysteresis is not added to the comparison between the desired MAP and the turbo basic pressure. As a result, an overshoot in MAP can be avoided, thereby avoiding throttle plate oscillation.

To move the throttle plate from a throttled position to a wide open position, the desired MAP must be greater than a sum of the turbo basic pressure and a hysteresis and the pressure difference between the inlet pressure and the outlet pressure must be below a first threshold. A hysteresis is added to the comparison between the desired MAP and the turbo basic pressure. When the desired MAP is not greater than the sum of the turbo basic pressure and the hysteresis, the throttle plate cannot be moved from a throttled state to an unthrottled state regardless of the pressure difference between the inlet pressure and the outlet pressure. In response to the command from the pressure comparison module 52, the throttle plate control module 54 moves the throttle plate to the wide open position.

Alternatively, when the desired MAP is greater than the turbo basic pressure, the pressure comparison module 52 may disable the throttle plate control module 54. The wastegate control module 56 may be activated to be used as the primary actuator to control the throttle position.

When the engine is not running, the throttle plate control module 54 moves the throttle plate according to the desired throttle position.

Figure 3:
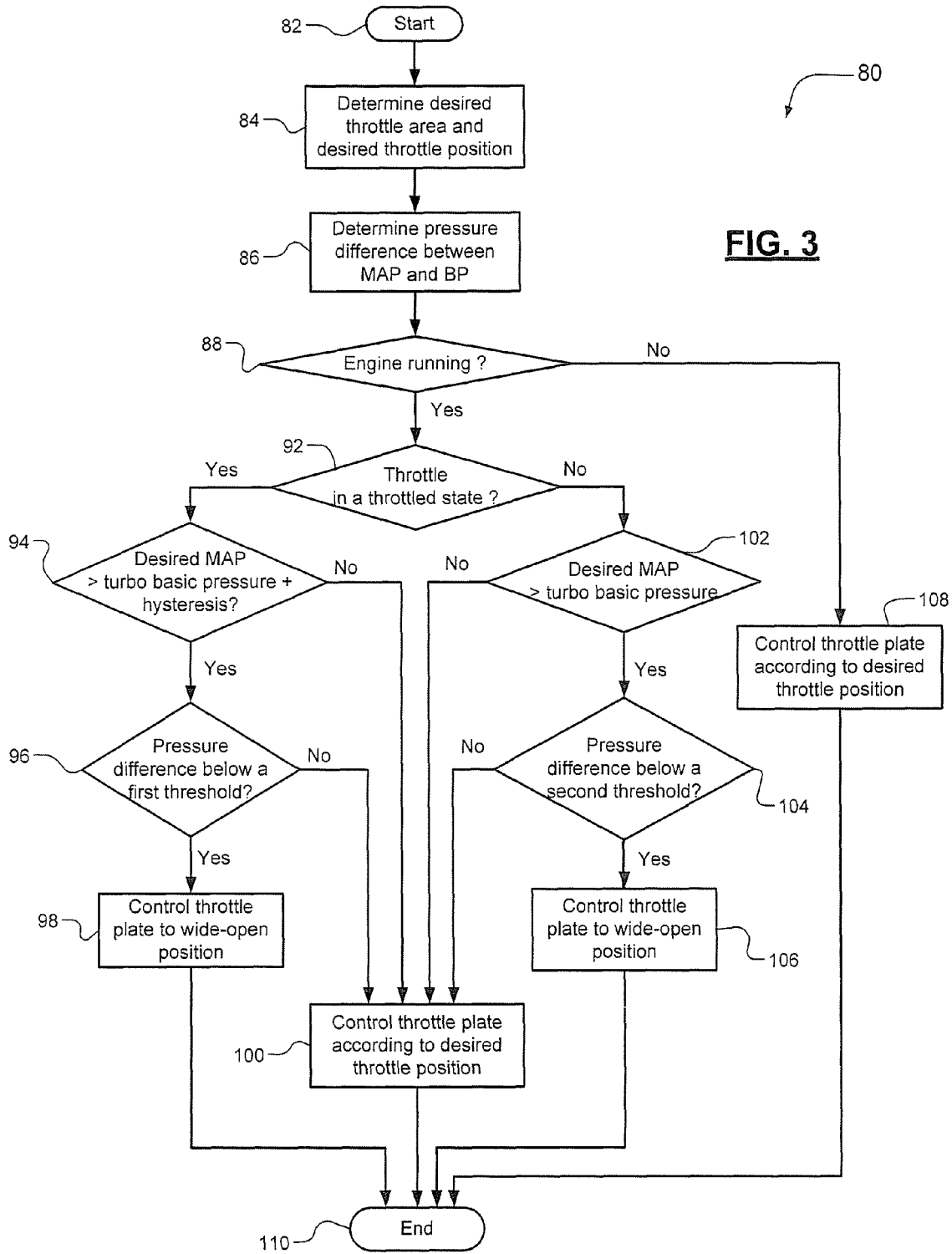
FIG. 3 is a flow diagram of a method of controlling a throttle plate according to the present disclosure.

Referring now to FIG. 3, a method 80 of controlling a throttle plate starts in step 82. The throttle area determination module 46 determines a desired throttle area and the throttle position determination module 48 determines a desired throttle position based on the desired throttle area in step 84. The pressure comparison module 52 determines a pressure difference across the throttle body 22 in step 86. When the engine 12 is running in step 88, the throttle state determination module 50 determines whether the throttle body 22 is in a throttled state in step 92. If the throttle body 22 is in the throttled state, the pressure comparison module 52 determines whether the desired MAP is greater than a sum of the turbo basic pressure and a hysteresis in step 94. If the desired MAP is greater than a sum of the turbo basic pressure and a hysteresis in step 94, the pressure comparison module 52 continues to determine whether the pressure difference between the inlet pressure and the outlet pressure is below a first threshold in step 96. If the pressure difference is below the first threshold, the throttle plate 24 is moved to a wide-open position to allow for a maximum air flow in step 98. If the desired MAP is not greater than a sum of the turbo basic pressure and hysteresis in step 94 or if the pressure difference between the inlet pressure and the outlet pressure is not below the first threshold in step 96, the method 80 goes to step 100. In step 100, the throttle plate 24 is controlled according to the desired throttle position.

If the throttle body 22 is in an unthrottled state (i.e., the throttle plate 24 is in a wide-open position) in step 92, the pressure comparison module 52 determines whether the desired MAP is greater than the turbo basic pressure in step 102. If the desired MAP is greater than the turbo basic pressure, the pressure comparison module 52 continues to determine whether the pressure difference between the inlet pressure and the outlet pressure is below a second threshold in step 104. If the pressure difference is below the second threshold in step 98, the throttle plate 24 remains in the wide-open position in step 106. If the desired MAP is not greater than the turbo basic pressure in step 102 or if the pressure difference between the inlet pressure and the outlet pressure is greater than or equal to the second threshold in step 98, the throttle plate 24 is controlled according to the desired throttle position in step 100.

When the engine 88 is not running in step 88, the throttle plate control module 54 controls the throttle plate according to the desired throttle position in step 108. The method 80 ends in step 110.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A throttle control system comprising:
   a pressure comparison module that determines an inlet pressure upstream from a throttle body and an outlet pressure downstream from the throttle body; and
   a throttle plate control module that controls a position of a throttle plate based on the inlet pressure and the outlet pressure during boost applications.

2. The throttle control system of claim 1 wherein the throttle plate control module moves the throttle plate from a first throttle position to a second throttle position when a pressure difference between the inlet pressure and the outlet pressure is greater than or equal to a first threshold.

3. The throttle control system of claim 2 wherein the throttle plate control module moves the throttle plate from the first throttle position to a wide-open position when the pressure difference is less than the first threshold.

4. The throttle control system of claim 3 wherein the throttle plate control module transitions the throttle plate from the wide-open position to a third throttle position when the pressure difference is greater than or equal to a second threshold, wherein the third throttle position is determined based on a desired engine torque.

5. The throttle control system of claim 4 wherein the second threshold is higher than the first threshold.

6. The throttle control system of claim 1 wherein the pressure comparison module determines a pressure ratio of the outlet pressure to the inlet pressure, and the throttle plate control module moves the throttle plate based on the pressure ratio.

7. The throttle control system of claim 1 wherein the inlet pressure is barometric pressure and the outlet pressure is a manifold air pressure.

8. A throttle control system comprising:
   a pressure comparison module that determines an inlet pressure upstream from a throttle body and an outlet pressure downstream from the throttle body; and
   a throttle plate control module that controls a position of a throttle plate based on the inlet pressure, the outlet pressure, a desired mass air pressure (MAP) and a turbo basic pressure when an engine is started.

9. The throttle control system of claim 8 wherein the throttle plate control module moves the throttle plate from a wide-open position to a desired throttle position when the desired MAP is not greater than the turbo basic pressure or when a difference between the inlet pressure and the outlet pressure is equal to or greater than a second threshold.

10. The throttle control system of claim 8 wherein the throttle plate control module moves the throttle plate from a first throttle position to a second throttle position when the desired MAP is greater than a sum of the turbo basic pressure and a hysteresis and when a pressure difference between the inlet pressure and the outlet pressure is less than a first threshold.

11. The throttle control system of claim 8 further comprising a wastegate control module that is selectively activated to control a wastegate to move the throttle plate to a desired throttle position when the desired MAP is greater than the turbo basic pressure.

12. A method of controlling a throttle plate comprising:
    determining an inlet pressure upstream from a throttle body and an outlet pressure downstream from the throttle body; and
    controlling the throttle plate based on the inlet pressure and the outlet pressure during boost applications.

13. The method of claim 12 further comprising moving the throttle plate from a first throttle position to a second throttle position when a pressure difference between the inlet pressure and the outlet pressure is greater than or equal to a first threshold, wherein the first throttle position and the second throttle position are determined based on a desired engine torque.

14. The method of claim 12 further comprising moving the throttle plate to a wide-open position when a pressure difference between the inlet pressure and the outlet pressure is less than a first threshold.

15. The method of claim 14 further comprising moving the throttle plate from the wide-open position to a third throttle position when the pressure difference is greater than or equal to a second threshold, wherein the second threshold is greater than the first threshold and the third throttle position is determined based on a desired engine torque.

16. The method of claim 12 wherein the inlet pressure is barometric pressure and the outlet pressure is a manifold air pressure.

17. A method of controlling a throttle plate comprising:
    determining an inlet pressure upstream from a throttle body and an outlet pressure downstream from the throttle body; and
    controlling a position of the throttle plate based on the inlet pressure, the outlet pressure, a desired mass air pressure (MAP) and a turbo basic pressure, when an engine is started.

18. The method of claim 17 further comprising moving the throttle plate from a wide-open position to a desired throttle position when the desired MAP is not greater than the turbo basic pressure or when a difference between the inlet pressure and the outlet pressure is greater than or equal to a second threshold.

19. The method of claim 17 further comprising moving the throttle plate from a first throttle position to a second throttle position when the desired MAP is greater than a sum of the turbo basic pressure and a hysteresis and when a difference between the inlet pressure and the outlet pressure is less than a first threshold.

* * * * *